United States Patent [19]

McCubbin

[11] Patent Number: 4,872,792

[45] Date of Patent: Oct. 10, 1989

[54] PISTOL GRIP CHECKERING

[75] Inventor: Kim M. McCubbin, Longrove, Iowa

[73] Assignee: Springfield Armory, Inc., Geneseo, Ill.

[21] Appl. No.: 281,806

[22] Filed: Dec. 8, 1988

[51] Int. Cl.[4] ............................................. B23C 9/00
[52] U.S. Cl. ................................ 409/131; 144/136 J;
  144/358; 269/50; 269/69; 409/221
[58] Field of Search ............... 144/136 R, 136 J, 358;
  29/1.1; 269/50, 51, 69; 409/131, 132, 221, 223, 78

[56] References Cited

U.S. PATENT DOCUMENTS

| | | |
|---|---|---|
| 355,147 | 12/1886 | Denmead . |
| 1,744,362 | 1/1930 | Carter ................................ 409/76 |
| 2,079,323 | 5/1937 | Kotoriak .............................. 269/50 |
| 2,349,537 | 5/1944 | Carlsen ................................ 269/52 |
| 2,362,364 | 11/1944 | Dusevoir ............................ 409/131 |
| 2,397,086 | 3/1946 | Brady ................................ 409/132 |
| 2,543,405 | 2/1951 | Hayes . |
| 2,850,060 | 9/1958 | Voelz . |
| 2,966,098 | 12/1960 | Lingner ............................ 409/221 |
| 3,882,911 | 5/1975 | Pachmayr et al. . |
| 3,907,015 | 9/1975 | Pachmayr et al. . |
| 3,926,232 | 12/1975 | Pachmayr et al. . |
| 3,935,756 | 2/1976 | Ebert . |
| 4,529,342 | 7/1985 | Babel ................................ 409/221 |

OTHER PUBLICATIONS

Gann's Custom.
Custom 45 Services, p. 9.
J. Michael Plaxco, 2/1/87.
G. Colt Officer's Model, p. 9.
Bar-Sto Match Barrel, p. 5.

Primary Examiner—W. Donald Bray
Attorney, Agent, or Firm—Woodard, Emhardt, Naughton, Moriarty & McNett

[57] ABSTRACT

A pistol grip checkering method, device and product having mill cuts both laterally and longitudinally on the convex face of a pistol grip frame. The cuts are precisely cut by milling machine. A rotatable holder is provided which is pivotable about an axis and which holds the pistol frame to be checkered, such as with a protruding male member inserted into the ammunition magazine receiving chamber within the grip. A supporting surface is provided which is oriented at an angle greater than 90° with respect to the axis and which supports the pistol grip frame. Indexing means are provided to incrementally index the rotatable holder about the axis to provide for successive longitudinal cuts on the convex face of the pistol grip frame.

18 Claims, 5 Drawing Sheets

PISTOL GRIP CHECKERING

BACKGROUND OF THE INVENTION

This invention relates generally to firearms, and more specifically to a method and device for checkering the grips of pistols.

Wooden pistol grips, gunstocks and the like have in the past been checkered to provide both an enhanced grip by the shooter and a decorative appearance. Typically, such checkering is accomplished by hand carving wood or hand filing metal. Although this may rise to the level of an art form by a skilled artisan, it is quite time consuming and costly. Various devices have been provided to automate this process for production purposes. Such automated devices are provided for rifle and shotgun stocks which are wooden.

Various patents show such checkering devices, including U.S. Pat. Nos. 2,543,405 and 2,850,060 showing various long stock checkering by cutters. U.S. Pat. Nos. 3,882,911, 3,907,015 and 3,926,232, each to Pachmayr et al. disclose a vibratory approach to compress checkering into a wooden stock.

The present invention provides an improved method and device for checkering pistol grips with precision and at a relatively low cost. The metal pistol grip frame itself is checkered, rather than a wooden stock or wooden grips screwed to the frame. Furthermore, the checkering is unusual in that it is mill cut, rather than being cast, or knurled, or other such technique. Accordingly, the checkering may be especially deep and sharply cut for exceptional gripping characteristics. The invention provides for superior results in terms of quality control and cost over prior manual piston grip checkering techniques.

SUMMARY OF THE INVENTION

According to one embodiment, the present invention provides a method for checkering the convex face of a piston grip frame, comprising the steps of mounting a metal pistol grip frame to a rotatable holder with the convex face of the pistol grip exposed, mill cutting a successive series of parallel, generally lateral cuts around a holder pivot axis, wherein the pistol grip frame by rotating the rotatable holder about a holder pivot axis, wherein the pistol grip frame is rotated with respect to a mill cutter, and mill cutting a successive series of parallel, generally longitudinal cuts along the convex face of the pistol grip frame by moving the pistol grip frame and a mill cutter longitudinally with respect to each other, wherein a pattern of cut checkering is formed in the convex face of the pistol grip frame.

The present invention also provides a device for checkering the convex face of a metal pistol grip frame, comprising rotatable holder, a base, a pivot between the rotatable holder and the base, wherein the rotatable holder is rotatable on the pivot about a holder pivot axis, and a male member attached to the rotatable holder and protruding therefrom, the male member being shaped to snugly fit into an ammunition magazine receiving chamber within the metal pistol grip frame to be checkered, wherein the pistol grip frame is rotatable around the holder pivot axis for mill cutting a successive series of parallel, generally lateral cuts around the convex face of the pistol grip frame.

An object of the present invention is to provide an improved pistol grip checkering method.

Related objects and advantages of the present invention are disclosed in the following description of the preferred embodiment.

DESCRIPTION OF THE PREFERRED EMBODIMENT

Figure 1:
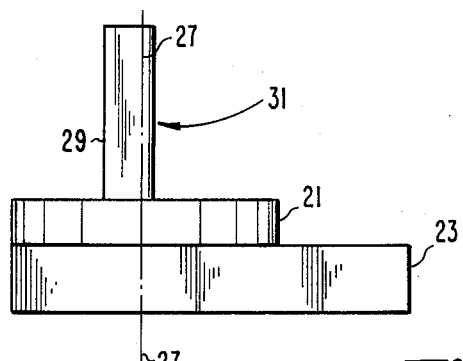
FIG. 1 is a side elevation view of the device of the present invention.

For purposes of promoting an understanding of the principles of the invention, reference will now be made to one specific example of the invention which is illustrated in the drawings.

Figure 7:
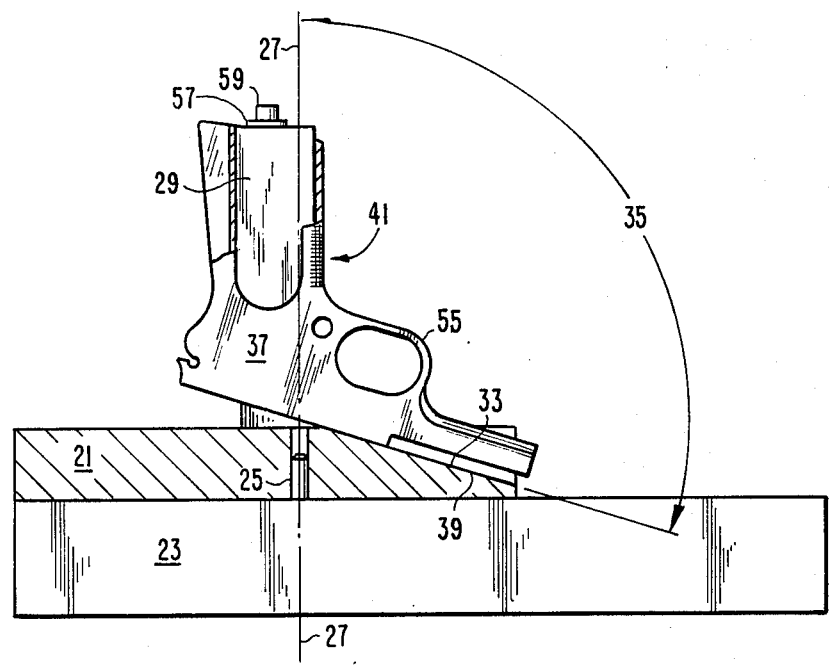
FIG. 7 is a side elevation partially cutaway view of the present invention with a pistol grip frame mounted thereto.

Referring to the drawing figures, rotatable holder 21 is mounted to base 23 at pivot 25 (see FIG. 7). Rotatable holder 21 is pivotable with respect to base 23 around pivot 25 about holder pivot axis 27. Preferably, rotatable holder 21 and base 23 are made of sturdy steel. Holder 21 is preferably round, forming a generally disk-shaped member. Rotatable holder 21 has male member 29 projecting upwardly and rigidly attached. Male member 29 is, in the preferred embodiment, an elongated, generally rectangular protrusion having convex surface 31 along the front side thereof. Male member 29 is so shaped to correspond to the shape of an ammunition magazine receiving chamber of a pistol grip frame in which it is to be inserted. Holder pivot axis 27 passes through male member 29.

Figure 6:
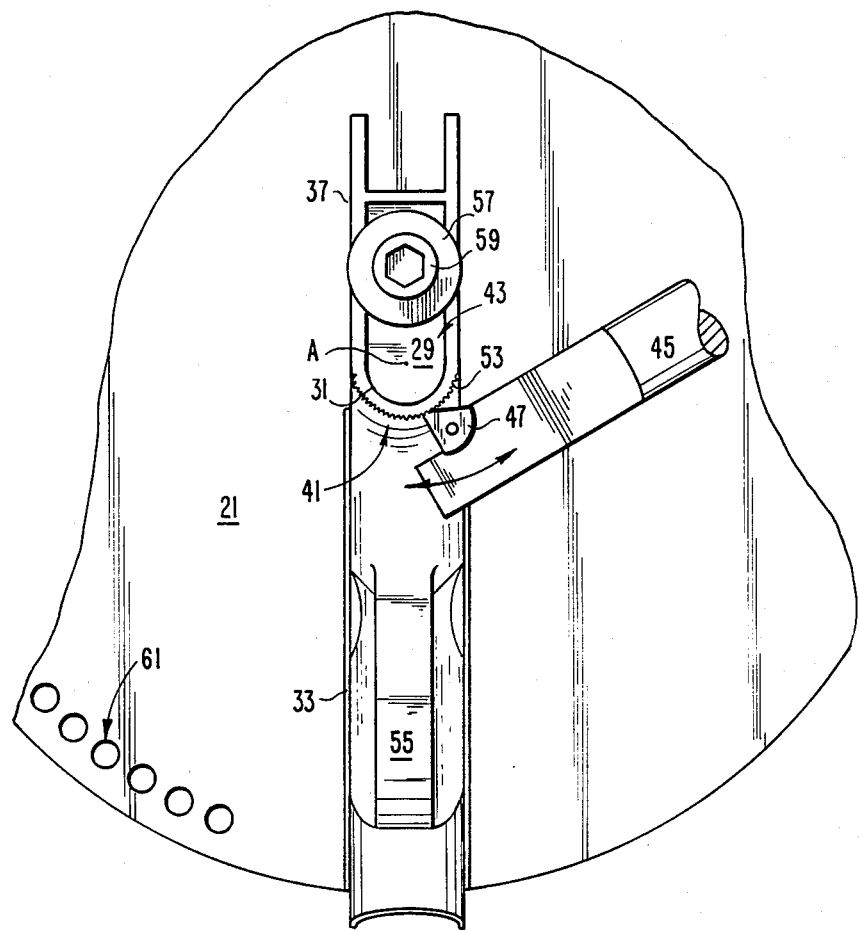
FIG. 6 is a top plan detail view of the present invention with a pistol grip frame mounted thereto.

Rotatable holder 21 has a radial channel therein with frame support surface 33 along the bottom. Frame support surface 33 forms a generally downward slope in a radially outward direction from holder pivot axis 27. Angle 35 is defined between holder pivot axis 27 and frame support surface 37. Angle 35 is greater than 90° and is, in the preferred embodiment, about 107°. This angle may vary from application to application but is, as previously indicated, greater than 90°. Angle 35 is so selected to accommodate the structure of pistol grip frame 37 which is to be checkered according to the present invention. Pistol grip frame has top surface 39 along the top edge which rests against support surface 33 (see FIGS. 7-9). Pistol grip frame 37 has convex face 41 along the front of the grip and beneath trigger guard 55. Convex face 41 may be partially cylindrical in shape with the curvature of such cylinder defining major axis A (see FIGS. 6, 8 and 9). Major axis A accordingly is positioned within pistol grip frame 37, and more specifically in ammunition magazine receiving chamber 43 as illustrated.

Pistol grip frame 37 as illustrated in a frame for a 1911 .45 caliber semiautomatic pistol. Other pistol frame designs may be used in the present invention as well. Ammunition magazine receiving chamber 43 is used to receive the ammunition magazine or clip therein.

As illustrated in FIGS. 4–7, male member 29 is inserted into ammunition magazine receiving chamber 43. Male member 29 is shaped to snugly fit into ammunition magazine receiving chamber 43 to hold it firmly in place. In such mounted mode, major axis A coincides with holder pivot axis 27. Accordingly, rotation of rotatable holder 21 about pivot 25 causes pistol grip frame 37 to correspondingly rotate about major axis A. Convex face 41 thereby rotates around holder pivot axis 27 while maintaining a constant radius from axis 27. Pistol grip frame 37 may be held in place on male member 29 by any suitable means such as washer 57 and bolt 59.

Mill cutter 45 is provided with a cutting piece 47. Mill cutter 45 may be, for example, a CNC (Computer Numerical Controlled) Mill Machine, Model 604-10 offered by the Ex-Cell-O corporation of Canada, Ltd., London, Ontario. Note that such mill cutter, when used in the present invention, actually cuts away metal from piston grip frame 37 to form checkering, rather than deformation techniques such as knurling or rather than casting of the pistol grip frame itself.

Figure 2:
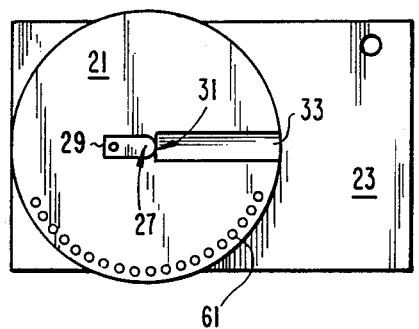
FIG. 2 is a top plan view of the device of FIG. 1.
Figure 3:
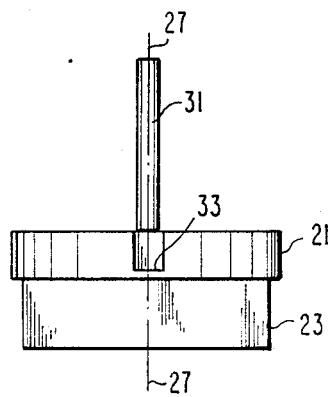
FIG. 3 is a front elevation view of the device of FIG. 1.
Figure 4:
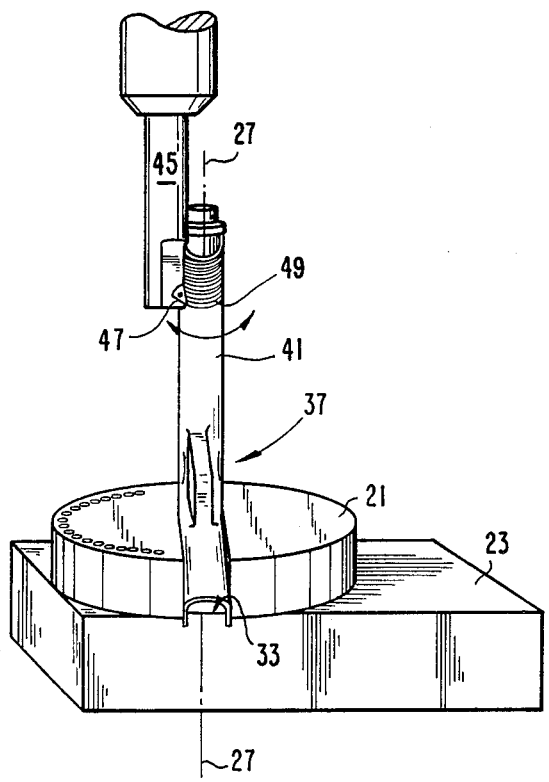
FIG. 4 is a perspective view of the present invention with a pistol grip frame mounted thereto.

Referring to FIGS. 5, 6 and 8–10, the present invention is shown with both lateral cuts 49 and longitudinal cuts 51 being made in convex face 41 to form checkering 53. The longitudinal cuts are in a vertical orientation with respect to pistol grip frame 37 in a direction towards trigger guard 55. Lateral cuts 49 are in a horizontal orientation around the cylindric curvature of convex face 41. In the illustrated invention, there is a successive series of parallel, lateral cuts 49 around the convex face of pistol grip frame 37. Also, there is a successive series of parallel, longitudinal cuts 51 along the convex face of pistol grip frame 37. In the illustrated embodiment, there are nineteen longitudinal cuts. This number of longitudinal cuts corresponds with a radial series of index holes such as index hole 61 (see FIGS. 2, 5 and 6). These index holes are used in conjunction with index pin 63 for indexing the angular position of rotatable holder 21 about holder pivot axis 27. The successive series of parallel, longitudinal cuts 51 correspond to these indexing holes 61.

Thus, for checkering the convex face of pistol grip frame 37, the operator first mounts pistol grip frame 37 to rotatable holder 21 by inserting male member 29 into ammunition magazine receiving chamber 43. Pistol grip frame 37 is held in place by a suitable means such as washer 57 and bolt 59. The operator then proceeds to mill cutting checkering into the convex face of the metal pistol grip frame. A series of parallel, lateral cuts is mill cut around the convex face 41 by rotating rotatable holder 21 (see FIG. 4). Such rotation occurs about holder pivot axis 27, wherein pistol grip frame 37 is rotated with respect to mill cutter 45 as illustrated by the two headed arrow in FIG. 4. Convex face 41 is exposed for mill cutting when mounted on rotatable holder 21. Due to the partially cylindrical shape of convex face 41, with major axis A coinciding with holder pivot axis 27 as described above, rotation of rotatable holder 21 allows for a constant cutting depth to be maintained during the arcuate cut by mill cutter 45. A successive series of such lateral cuts is made by moving pistol grip frame 37 with respect to mill cutter 45. In this way, the lateral cuts are made with great precision both in terms of a constant depth around convex face 41 but also in terms of being parallel with respect to each other.

Figure 5:
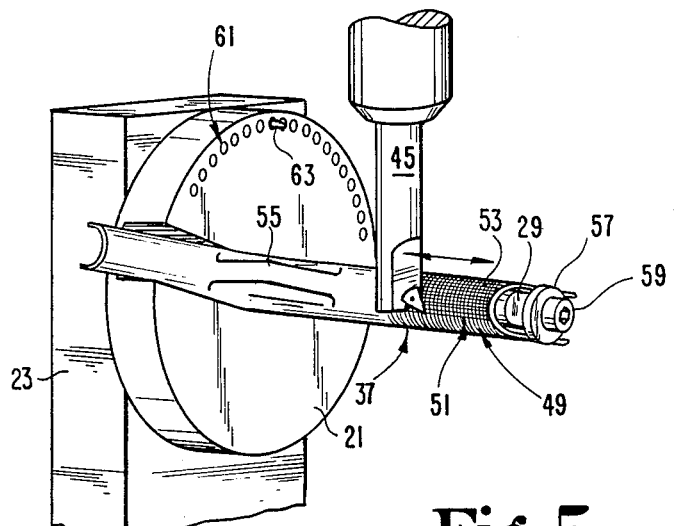
FIG. 5 is another perspective view of the present invention with a pistol grip frame mounted thereto.

The operator also mill cuts a successive series of parallel, longitudinal cuts 51 along convex face 41 of pistol grip frame 37 (see FIG. 5). The mounted pistol grip frame is positioned with respect to mill cutter 45, and then pistol grip frame 37 and mill cutter 45 are moved longitudinally with respect to each other, as illustrated by the two-headed arrow in FIG. 5. The first cut is made with indexing pin 63 in a first one of index holes. After the first cut, rotatable holder 21 is pivoted about holder pivot axis to the next index hole wherein index pin 63 in reinserted. Index hole 61 in the fourth index hole, corresponding to the fourth longitudinal cut. In this way, precise and consistent spacing between the successive series of parallel, longitudinal cuts may be maintained along the convex face of the pistol grip frame. Since major axis A coincides with holder pivot axis 27, the depth of such longitudinal cuts 51 is the same between successive cuts and are radially disposed about major axis A.

Figure 10:
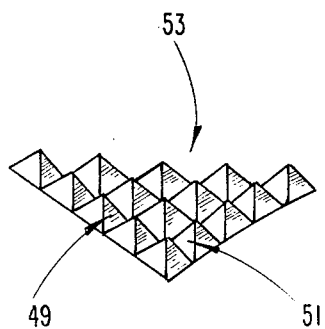
FIG. 10 is a perspective detail view of checkering in accordance with the present invention.
Figure 8:
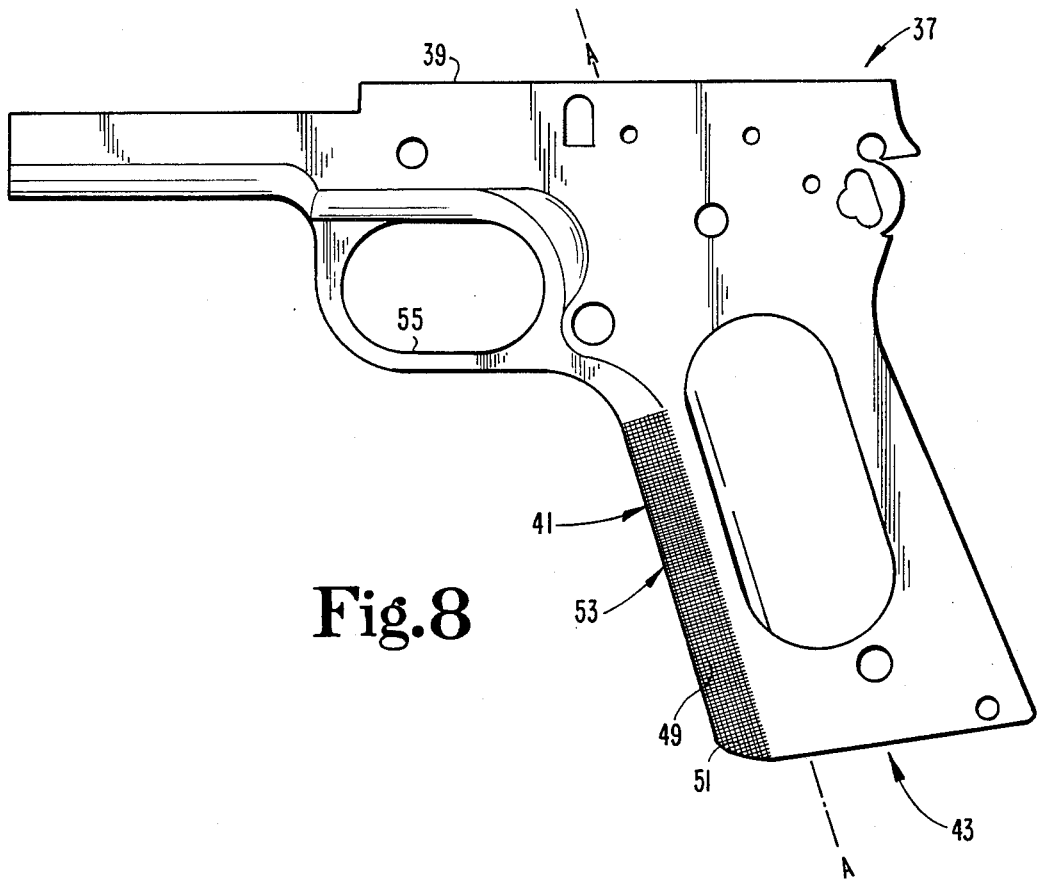
FIG. 8 is a side elevation view of a pistol grip frame having been checkered in accordance with the present invention.
Figure 9:
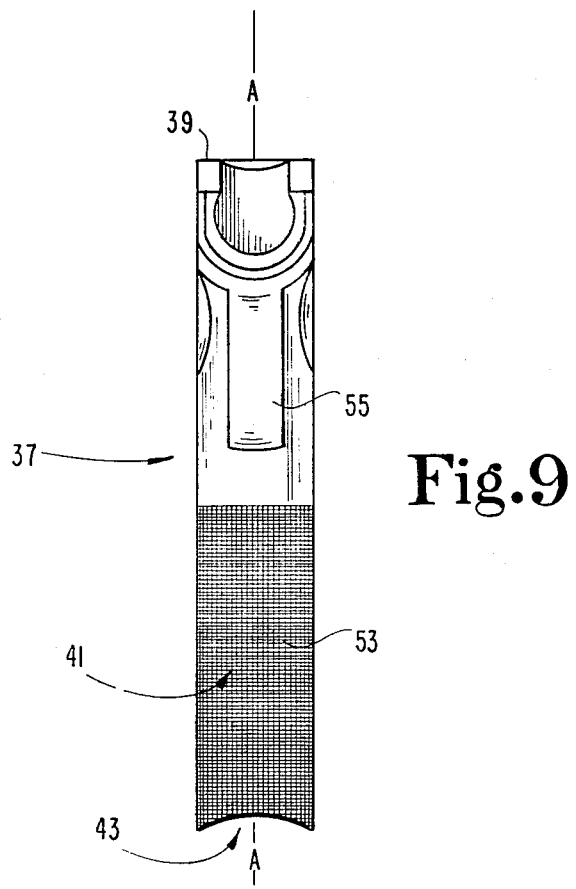
FIG. 9 is a front elevation view of a pistol grip frame having been checkered in accordance with the present invention.

As illustrated in FIGS. 8–10, the finished, checkered pistol grip frame 37 according to the present invention provides particular useful and ornamental advantages. The mill cut checkering 53 is deeper and sharper than conventional knurling, casting, filing or other such techniques. Furthermore, great precision is maintained providing for a more aesthetically pleasing product. Yet, production costs are maintained at a reasonable level by avoiding the need of hand crafted cuts. The mill cutting may provide for unusually sharp and deep cuts forming "V" shaped grooves intersecting to define pyramidal projections (see FIG. 10). Furthermore, the deep checkering which is available provides for an unusually grippable surface, not likely to slide with respect to the shooter's fingers.

Pistol grip frame 37 is preferably made of metal, but the present invention could also be utilized with plastics which are being introduced in the arms making art in lieu of metal. Also, the lateral and longitudinal cuts may be helical instead of or in addition to the straight and pependicular cuts in the pistol grip frame.

While the invention has been illustrated and described in detail in the drawings and foregoing description, the same is to be considered as illustrative, it being understood that only the preferred embodiment has been shown and described.

What is claimed is:

1. A method for checkering the convex face of a pistol grip frame, comprising the steps of:
   mounting a metal pistol grip frame to a rotatable holder with the convex face of said pistol grip exposed;
   mill cutting a successive series of parallel, generally lateral cuts around the convex face of said pistol grip frame by rotating said rotatable holder about a holder pivot axis, wherein said pistol grip frame is rotated with respect to a mill cutter; and
   mill cutting a successive series of parallel, generally longitudinal cuts along the convex face of said pistol grip frame by moving said pistol grip frame and a mill cutter longitudinally with respect to each other, wherein a pattern of cut checkering is formed in the convex face of said pistol grip frame.

2. The method of claim 1 wherein said pistol grip frame has an ammunition magazine receiving chamber within the grip, and wherein said rotatable holder includes a male member attached thereto, and wherein said mounting step includes the step of inserting said male member into said magazine chamber.

3. The method of claim 2 wherein said convex face of said pistol grip frame has a partially cylindrical shape the curvature of which defines a major axis within said pistol grip frame, wherein said major axis coincides with said holder pivot axis when said pistol grip frame is mounted to said rotatable holder, and wherein said mill cutter maintains a constant cutting depth during said step of mill cutting a successive series of parallel, lateral cuts around the convex face of said pistol grip frame during rotation of said rotatable holder.

4. The method of claim 3 wherein said rotatable holder has incremental indexing means for indexing the angular position of said rotatable holder about said holder pivot axis, and wherein said step of mill cutting a successive series of parallel, longitudinal cuts includes the step of indexing said rotatable holder about a series of angular positions corresponding to said series of longitudinal cuts.

5. The method of claim 4 wherein said rotatable holder has a pistol grip frame support surface oriented at an angle greater than 90° with respect to said holder pivot axis, wherein said support surface provides support for the top surface of said pistol grip frame.

6. The method of claim 5 wherein said male member is an elongated, generally rectangular protrusion having a convex surface along one side thereof and corresponding to the shape of said ammunition magazine receiving chamber.

7. The method of claim 1 wherein said convex face of said pistol grip frame has a partially cylindrical shape the curvature of which defines a major axis within said pistol grip frame, wherein said major axis coincides with said holder pivot axis when said pistol grip frame is mounted to said rotatable holder, and wherein said mill cutter maintains a constant cutting depth during said step of mill cutting a successive series of parallel, lateral cuts around the convex face of said pistol grip frame during rotation of said rotatable holder.

8. The method of claim 1 wherein said rotatable holder has incremental indexing means for indexing the angular position of said rotatable holder about said holder pivot axis, and wherein said step of mill cutting a successive series of parallel, longitudinal cuts includes the step of indexing said rotatable holder about a series of angular positions corresponding to said series of longitudinal cuts.

9. The method of claim 1 wherein said rotatable holder has a pistol grip frame support surface oriented at an angle greater than 90° with respect to said holder pivot axis, wherein said support surface provides support for the top surface of said pistol grip frame.

10. The method of claim 2 wherein said male member is an elongated, generally rectangular protrusion having a convex surface along one side thereof and corresponding to the shape of said ammunition magazine receiving chamber.

11. A device for checkering the convex face of a metal pistol grip frame, comprising:
rotatable holder;
a base;
a pivot between said rotatable holder and said base, wherein said rotatable holder is rotatable on said pivot about a holder pivot axis; and
a male member attached to said rotatable holder and protruding therefrom, said male member being shaped to snugly fit into an ammunition magazine receiving chamber within the metal pistol grip frame to be checkered, wherein the pistol grip frame is rotatable around said holder pivot axis for mill cutting a successive series of parallel, generally lateral cuts around the convex face of the pistol grip frame.

12. The device of claim 11 wherein said male member is an elongated, generally rectangular protrusion having a convex surface along one side thereof and corresponding to the shape of the ammunition magazine receiving chamber.

13. The device of claim 12 wherein said rotatable holder has a pistol grip frame support surface oriented at an angle greater than 90° with respect to said holder pivot axis, wherein said support surface provides support for the top surface of the pistol grip frame.

14. The device of claim 13 wherein the convex face of said pistol grip frame has a partially cylindrical shape the curvature of which defines a major axis within the pistol grip frame, wherein said major axis coincides with said holder pivot axis when the pistol grip frame is mounted to said rotatable holder for maintaining a constant cutting depth during mill cutting a successive series of parallel, lateral cuts around the convex face of the pistol grip frame during rotation of said rotatable holder.

15. The device of claim 14 wherein said rotatable holder has incremental indexing means for indexing said rotatable holder about a series of angular positions about said holder pivot axis corresponding to a successive series of parallel, longitudinal cuts mill cut into the convex face of the pistol grip frame.

16. The device of claim 11 wherein said rotatable holder has a pistol grip frame support surface oriented at an angle greater than 90° with respect to said holder pivot axis, wherein said support surface provides support for the top surface of the pistol grip frame.

17. The device of claim 11 wherein the convex face of said pistol grip frame has a partially cylindrical shape the curvature of which defines a major axis within the pistol grip frame, wherein said major axis coincides with said holder pivot axis when the pistol grip frame is mounted to said rotatable holder for maintaining a constant cutting depth during mill cutting a successive series of parallel, lateral cuts around the convex face of the pistol grip frame during rotation of said rotatable holder.

18. The device of claim 11 wherein said rotatable holder has incremental indexing means for indexing said rotatable holder about a series of angular positions about said holder pivot axis corresponding to a successive series of parallel, longitudinal cuts mill cut into the convex face of the pistol grip frame.

* * * * *

UNITED STATES PATENT AND TRADEMARK OFFICE
CERTIFICATE OF CORRECTION

PATENT NO. : 4,872,792

DATED : October 10, 1989

INVENTOR(S) : Kim M. McCubbin

It is certified that error appears in the above-identified patent and that said Letters Patent is hereby corrected as shown below:

Title page:

In the Abstract at line 4, after the word "by", please insert the word --a--.

At column 1, line 45, this line should read --around the convex face of the pistol grip--.

At column 4, line 17, this line should read --index pin 63 is reinserted. Index hole 61 is the fourth--.

Signed and Sealed this

Thirtieth Day of October, 1990

Attest:

HARRY F. MANBECK, JR.

*Attesting Officer*  *Commissioner of Patents and Trademarks*